US010052650B2

(12) United States Patent
Ross et al.

(10) Patent No.: US 10,052,650 B2
(45) Date of Patent: Aug. 21, 2018

(54) HOT MELT SYSTEM FEED ASSEMBLY

(71) Applicant: Graco Minnesota Inc., Minneapolis, MN (US)

(72) Inventors: Daniel P. Ross, Maplewood, MN (US); Joseph E. Tix, Hastings, MN (US); Nicholas K. Studt, Roberts, WI (US)

(73) Assignee: Graco Minnesota Inc., Minneapolis, MN (US)

( * ) Notice: Subject to any disclaimer, the term of this patent is extended or adjusted under 35 U.S.C. 154(b) by 198 days.

(21) Appl. No.: 15/021,328

(22) PCT Filed: Sep. 10, 2014

(86) PCT No.: PCT/US2014/054969
§ 371 (c)(1),
(2) Date: Mar. 11, 2016

(87) PCT Pub. No.: WO2015/038631
PCT Pub. Date: Mar. 19, 2015

(65) Prior Publication Data
US 2016/0221023 A1  Aug. 4, 2016

Related U.S. Application Data

(60) Provisional application No. 61/876,430, filed on Sep. 11, 2013.

(51) Int. Cl.
*B05C 11/10* (2006.01)
*B65G 53/24* (2006.01)
*B05C 5/02* (2006.01)

(52) U.S. Cl.
CPC ...... *B05C 11/1002* (2013.01); *B05C 11/1042* (2013.01); *B65G 53/24* (2013.01); *B05C 5/02* (2013.01)

(58) Field of Classification Search
CPC ......... B04C 5/04; B04C 9/00; B05C 11/1002; B05C 11/1042; B05C 5/02; B65G 53/24
See application file for complete search history.

(56) References Cited

U.S. PATENT DOCUMENTS 2,534,702 A * 12/1950 Driessen .............. B04C 5/02
209/719
6,833,016 B2 * 12/2004 Witter ................. B01D 50/002
451/88

(Continued)

FOREIGN PATENT DOCUMENTS

| CN | 1231487 A | 12/1999 |
| CN | 2396894 Y | 9/2000 |

(Continued)

OTHER PUBLICATIONS

International Search Report and Written Opinion dated Nov. 21, 2014, for corresponding PCT Application No. PCT/US2014/054969.

(Continued)

*Primary Examiner* — Timothy L Maust
*Assistant Examiner* — Timothy P Kelly
(74) *Attorney, Agent, or Firm* — Kinney & Lange, P.A.

(57) ABSTRACT

A feed assembly for a melter includes a funnel, an inlet into the funnel, and a fan baffle situated atop the funnel. The funnel is oriented along a vertical axis, and has a funnel surface that narrows towards an outlet into the melter. The inlet is angled tangent to and downward towards the funnel surface to inject meltable pellets onto the funnel surface in a vortex pattern. The fan baffle is situated atop the funnel, and has a plurality of blades angled to oppose the vortex pattern so as to permit airflow but redirect the meltable pellets from the inlet towards the funnel surface.

13 Claims, 4 Drawing Sheets

(56) References Cited

U.S. PATENT DOCUMENTS

| | | |
|---|---|---|
| 2002/0022080 A1 | 2/2002 | Collin et al. |
| 2002/0056513 A1 | 5/2002 | Tabuchi |
| 2004/0161531 A1 | 8/2004 | Ferber et al. |
| 2008/0234120 A1 | 9/2008 | Fort |
| 2009/0255835 A1 | 10/2009 | Pipes et al. |
| 2010/0248926 A1 | 9/2010 | Pipes et al. |

FOREIGN PATENT DOCUMENTS

| | | |
|---|---|---|
| CN | 1511274 A | 8/2004 |
| JP | 2004-067107 A | 3/2004 |

OTHER PUBLICATIONS

First Office Action from Chinese Patent Application No. 201480049906.0, dated Mar. 14, 2017, 9 pages.

\* cited by examiner

HOT MELT SYSTEM FEED ASSEMBLY

BACKGROUND

The present disclosure relates generally to systems for melting and dispensing hot melt adhesive. More particularly, the present disclosure relates to an adhesive melter pellet feed assembly.

Hot melt dispensing systems are typically used in manufacturing assembly lines to automatically disperse an adhesive used in the construction of packaging materials such as boxes, cartons and the like. Hot melt dispensing systems conventionally include a material tank, heating elements, a pump and a dispenser. Solid polymer pellets are melted in the tank using a heating element before being supplied to the dispenser by the pump. Because the melted pellets will re-solidify into solid form if permitted to cool, the melted pellets must be maintained at a temperature at or above their melting temperature from the tank to the dispenser. This typically requires placement of heating elements in the tank, the pump and the dispenser, as well as heating any tubing or hoses that connect those components. Furthermore, conventional hot melt dispensing systems typically utilize tanks having large volumes so that extended periods of dispensing can occur after the pellets contained therein are melted. However, the large volume of pellets within the tank requires a lengthy period of time to completely melt, which increases start-up times for the system. For example, a typical tank includes a plurality of heating elements lining the walls of a rectangular, gravity-fed tank such that melted pellets along the walls prevents the heating elements from efficiently melting pellets in the center of the container. Melter systems commonly receive solid adhesive pellets in an air-pressurized stream from a reservoir or source. Some melter systems receive pellets on demand in response to a drop in adhesive level in a melting melter.

SUMMARY

In one embodiment, a feed assembly for a melter includes a funnel, an inlet into the funnel, and a fan baffle situated atop the funnel. The funnel is oriented along a vertical axis, and has a funnel surface that narrows towards an outlet into the melter. The inlet is angled tangent to and downward towards the funnel surface to inject meltable pellets onto the funnel surface in a vortex pattern. The fan baffle is situated atop the funnel, and has a plurality of blades angled to oppose the vortex pattern so as to permit airflow but redirect the meltable pellets from the inlet towards the funnel surface.

In another embodiment, a hot melt adhesive system comprises a solid adhesive source, a melter, a funnel, and an inlet from the solid adhesive source into the funnel. The funnel is disposed along a vertical funnel axis on the melter, and has a funnel surface that narrows towards a planar outlet into the melter, normal to the funnel axis. The inlet is angled tangent to and downward towards the funnel surface to inject meltable pellets onto the funnel surface in a vortex pattern.

BRIEF DESCRIPTION OF THE DRAWINGS

FIG. 2b is a cross-sectional view of the feed assembly of FIG. 2a.

DETAILED DESCRIPTION

The present invention relates to a feed assembly for a hot melt system such as a system for melting and applying hot melt adhesive. This feed assembly includes a funnel aligned along a vertical axis, with a downward-angled tangent inlet that sprays pellets in a vortex pattern onto the surface of the funnel, thereby distributing pellets across a wide exit aperture at the bottom of the funnel.

Figure 1:
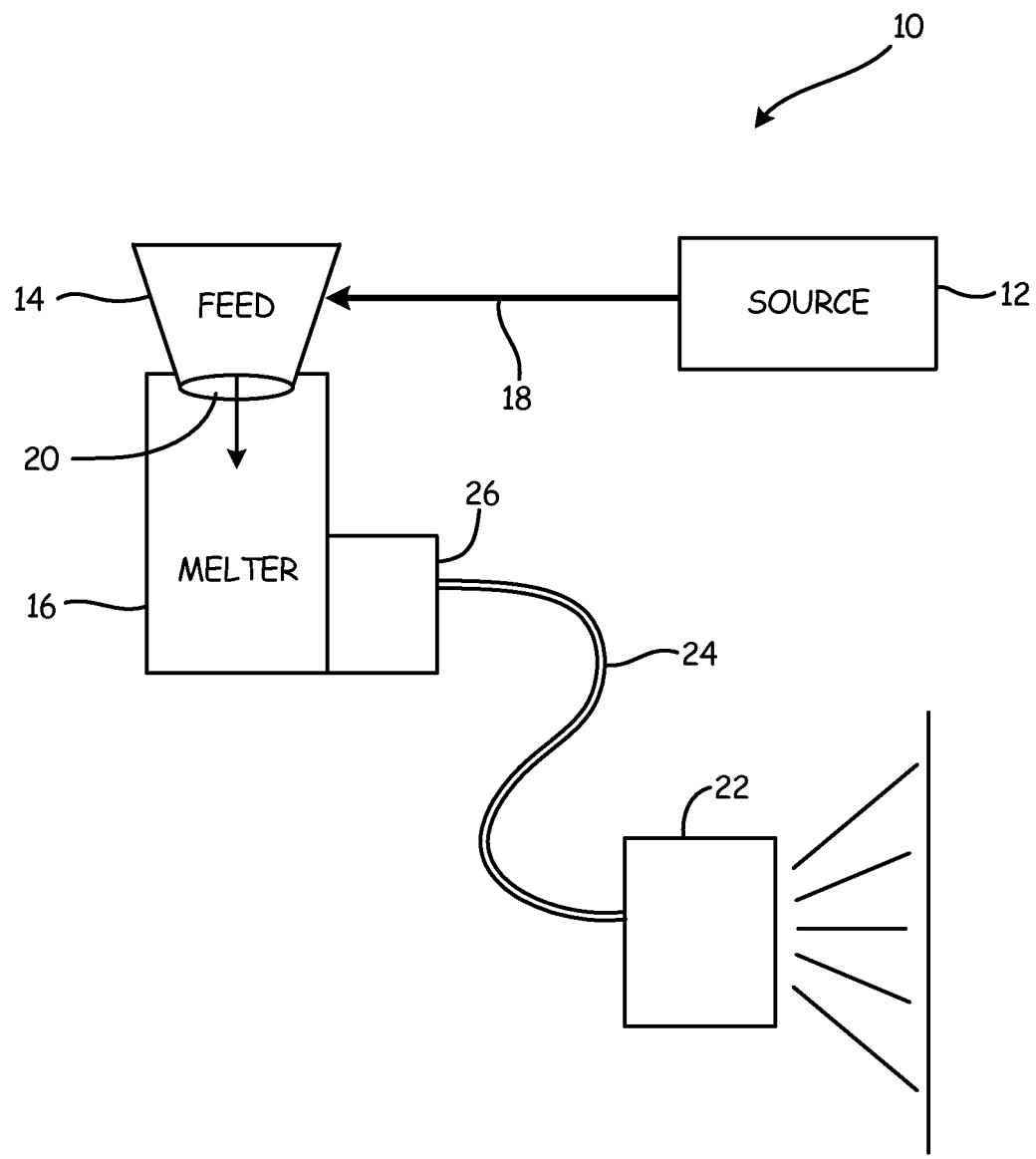
FIG. 1 is a schematic view of a hot melt system.

FIG. 1 is a schematic view of hot melt system 10, a simplified system for melting solid pellets or beads into a working fluid, and applying that fluid to a workpiece. Hot melt system 10 can, for example, be a hot melt adhesive system disposed to receive and melt adhesive pellets, and spray or otherwise apply that adhesive to a workpiece for bonding. Although the description hereafter focuses on a hot melt adhesive system, the feed assembly of the present invention may also be applied to other hot melt applications. Hot melt system 10 includes source 12, feed assembly 14, melter 16, inlet 18, feed outlet 20, applicator 22, heated hose 24, and pump 26.

Source 12 is a source of adhesive pellets used by hot melt system 10, such as a bin or reservoir. Suitable adhesives can include, for example, a thermoplastic polymer glue such as ethylene vinyl acetate (EVA) or metallocene. Feed assembly 14 is a distribution assembly that receives meltable pellets from source 12 via inlet 18, and distributes these pellets substantially uniformly across feed outlet 20 to melter 16. Inlet 18 can, for example, receive adhesive pellets from source 12 via a feed hose connected to an air-driven vacuum that draws pellets from source 12 as needed. In some alternative embodiments, inlet 18 can receive adhesive pellets via a gravity feed from source 12.

Melter 16 is a receptacle capable of containing and melting solid adhesive received from dispenser 20. Feed outlet 20 is a wide outlet with area at least half the cross-sectional melting area of melter 16, as described in greater detail below. This wide outlet area facilitates even distribution of unmelted adhesive across melter 16. Heated hose 24 carries melted adhesive from melter 16 to applicator 22 for deposition on workpieces. Pump 26 forces pressurized melted adhesive from melter 16 to applicator 22. In some embodiments applicator 22 can apply adhesive using pump pressure from pump 26. In other embodiments, additional pressurizing components may be incorporated into applicator 22.

Figure 2A:
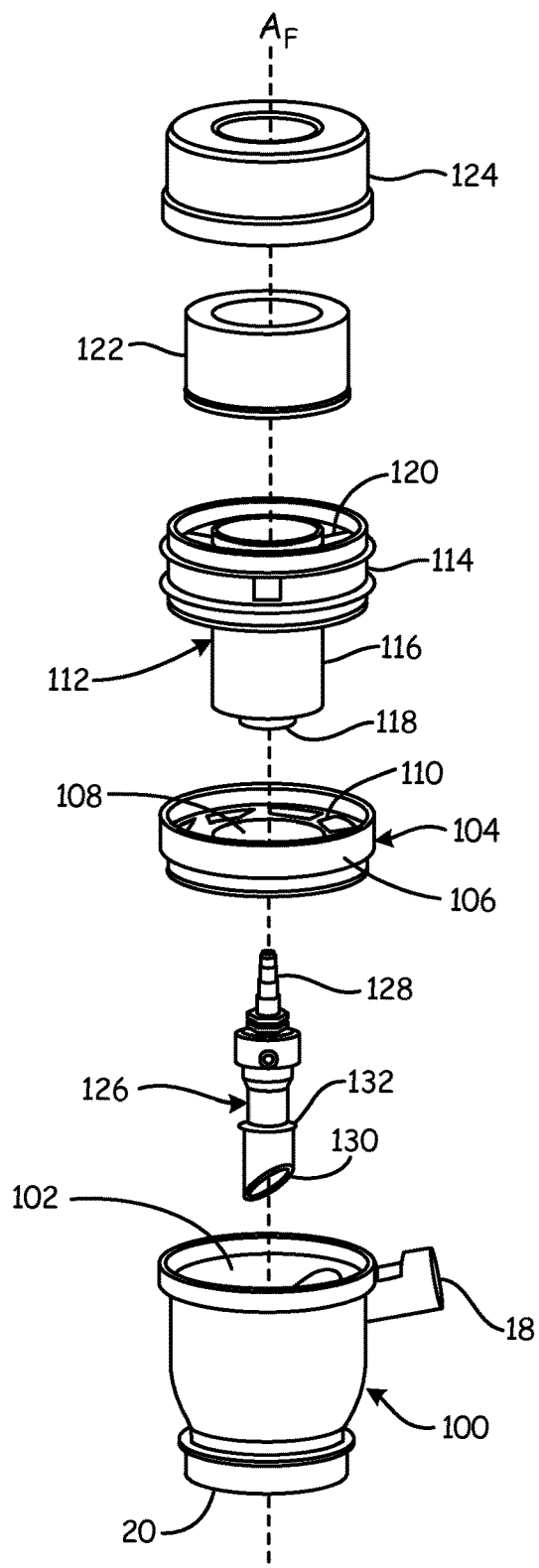
FIG. 2a is an exploded view of a feed assembly of the hot melt system of FIG. 1.
Figure 2B:
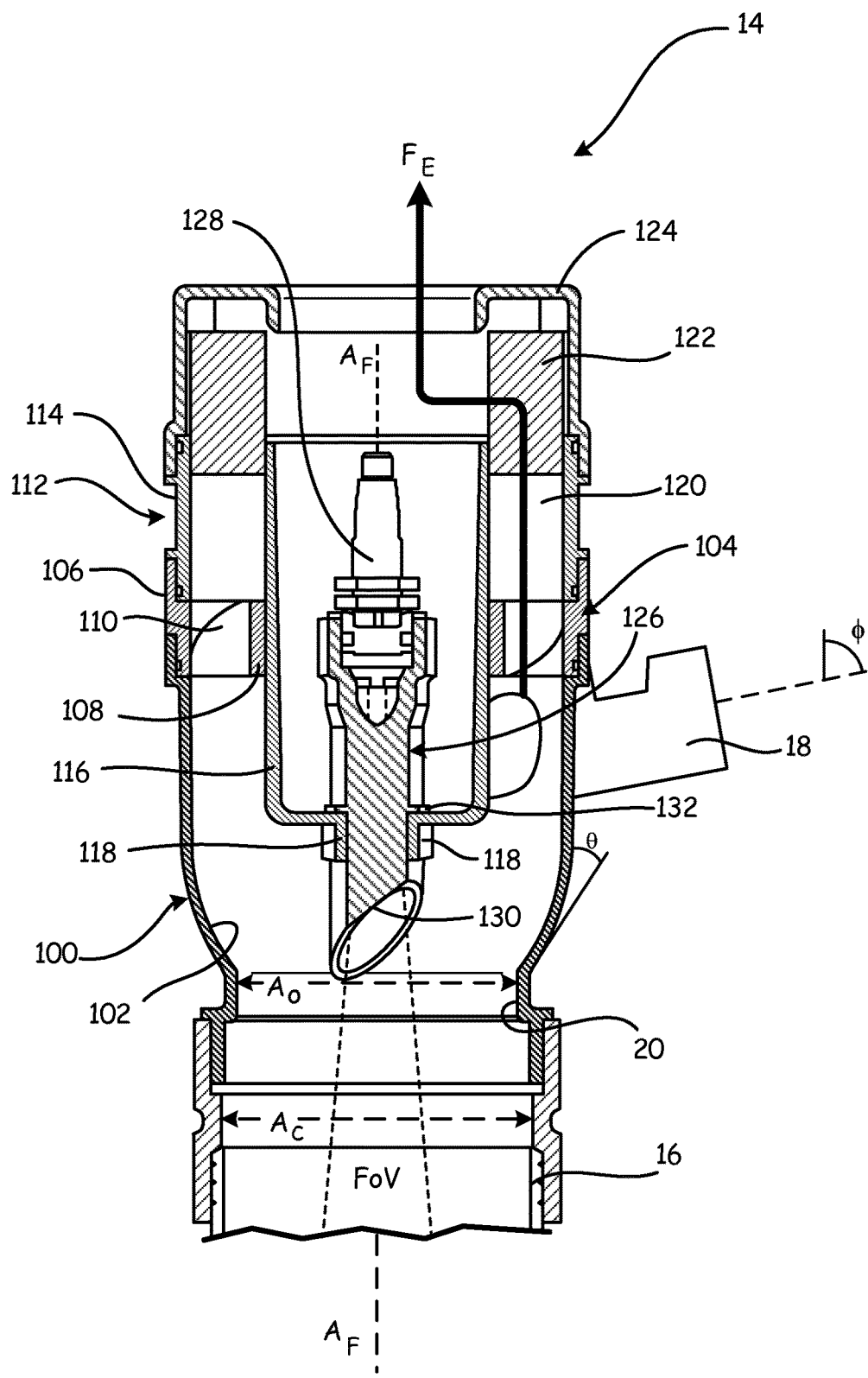

FIGS. 2a and 2b are exploded and cross-sectional views, respectively, of feed assembly 14. Feed assembly 14 has inlet 18 and feed outlet 20 as described above, and includes funnel 100 (with funnel surface 102), fan baffle 104 (with outer ring 106, inner ring 108, and fan blades 110), sensor housing 112 (with outer ring 114, inner ring 116, retainer 118, and ribs 120), filter 122, cap 124, sensor tower 126, sensor 128, tower opening 130, and tower rib 132.

Funnel 100 is a rigid structure oriented along funnel axis $A_F$, with funnel surface 102 converging from inlet 18 towards feed outlet 20. Funnel 100 distributes adhesive pellets from inlet 18 generally evenly throughout feed outlet 20, and thereby melter 16, so that melter 16 fills evenly, and the adhesive pellets melt uniformly. Funnel 100 also supports fan baffle 104, and thereby sensor housing 112, filter 122, cap 124, sensor tower 126, and sensor 128. Funnel surface 102 converges towards feed outlet 20, terminating at funnel angle θ (shown in FIG. 2b) with respect to funnel axis $A_F$. In some embodiments, funnel angle θ can be greater 20° and less than 90°. Funnel 100 meets melter 16 at feed outlet 20, a planar opening normal to funnel axis $F_A$. Feed outlet 20 has cross-sectional outlet area $A_O$ equal to at least half the cross-sectional melter area $A_C$ of melter 16, as shown. In some embodiments, cross-sectional area $A_O$ may closely approach cross-sectional area $A_C$. The width of feed outlet 20 relative to melter 16 allows solid adhesive to be distributed substantially evenly across melter 16.

Inlet 18 is radially offset relative to funnel axis $A_F$, and meets funnel 100 substantially at a tangent with respect to funnel surface 102. Inlet 18 is angled at inlet angle φ with respect to funnel axis $A_F$. Inlet angle φ can, for example, be greater than 65° and less than 75°. The location and orientation of inlet 18 ensures that adhesive pellets injected under pressure onto funnel surface 102 form a vortex pattern that distributes pellets substantially uniformly across the outer perimeter of feed outlet 20, while leaving a central vortex "eye" along funnel axis $A_F$ substantially clear of adhesive pellets. Adhesive pellets in funnel 100 substantially follow funnel surface 102, avoiding this central vortex "eye" along funnel axis $A_F$.

Feed assembly 14 in general, and funnel 100 in particular, operate at least partially via gravity feed. Gravity draws adhesive pellets from inlet 18 downward towards feed outlet 20, and away from fan baffle 104. In the depicted orientation, fan baffle 104 is situated immediately atop funnel 100, between funnel 100 and sensor housing 112, and includes outer ring 106, inner ring 108, and fan blades 110. Outer ring 106 abuts funnel 100, and is connected to inner ring 108 via fan blades 110. Fan blades 110 are angled to oppose the vortex pattern, so as to permit exit airflow along flow path $F_E$ while obstructing pellets. Fan blades 110 block stray pellets from inlet 18, preventing pellets from travelling upward through fan baffle 104 and fouling sensor housing 112 and filter 122. Fan blades 110 instead redirect stray pellets from inlet 18 toward funnel surface 102. Fan baffle 104 is described in greater detail below, with respect to FIG. 3.

Sensor housing 112 is an annular structure with outer ring 114 situated immediately atop outer ring 106 of fan baffle 104, and with inner ring 116 extending downward through inner ring 108 of fan baffle 104. Outer and inner rings 114 and 116 of sensor housing 112 are connected by ribs 120, which are vertically-oriented radial struts. Inner ring 116 terminates at a bottom-most location in retainer 118, a ring that engages tower rib 132 to support sensor tower 12, as described below.

Exit airflow $F_E$ passes through fan baffle 104 between outer ring 106, inner ring 108, and fan blades 110. Exit airflow $F_E$ then travels through sensor housing 112, between outer ring 114, inner ring 116, and ribs 120, to filter 122. Filter 122 is an air-permeable filter such as a mesh, cloth, or paper structure that collects particulates in exit airflow $F_E$, so that exit airflow $F_E$ is substantially clear of adhesive material when it leaves feed assembly 14. Cap 124 covers top and outer sides of filter 122, but is open along an interior annular surface to permit exit airflow $F_E$ to leave feed assembly 14.

Sensor tower 126 is a support structure that positions sensor 128 at a fixed distance from melter 16. Tower rib 132 is a circumferential protrusion that engages retainer 118 to secure sensor tower 126 at a fixed position within sensor housing 112. Sensor tower 126 extends into funnel 100, and can include threading or other attachment structures by which sensor 128 is secured. Sensor 128 is a downward-facing level sensor such as an ultrasonic or other acoustic sensor disposed to sense a level of adhesive within melter 16. Adhesive levels sensed by sensor 128 can be used for melter diagnostics, and/or to automatically actuate transmission of adhesive pellets from source 12 to feed assembly 14, should the adhesive level within melter 16 drop below acceptable operating levels. Sensor 128 has a field of view (FoV) directed towards melter 16, through tower opening 130. In some embodiments tower opening 130 can be angled to minimize its acoustic signature detected by sensor 128. Sensor tower 126 is oriented coaxially with funnel 100, along funnel axis $A_F$, such that tower opening 130 faces downward towards the "eye" of the funnel pattern formed by adhesive travelling from inlet 18 to feed outlet 20. This arrangement minimizes impingement of adhesive pellets traveling from inlet 18 to feed outlet 20 into the FoV of sensor 128, allowing for accurate level measurements.

Figure 3:
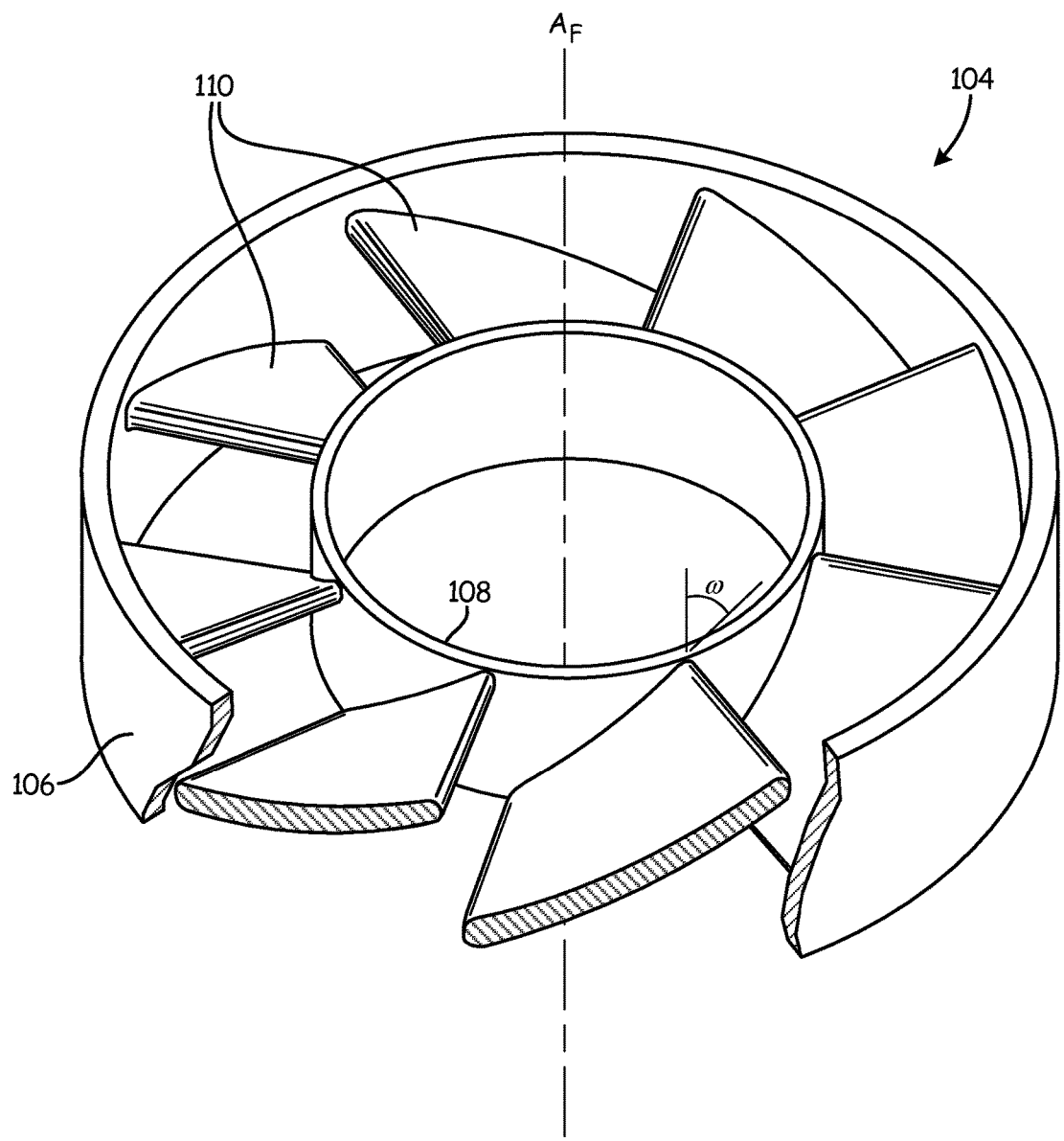
FIG. 3 is a perspective view of a fan baffle of the feed assembly of FIGS. 2a and 2b.

FIG. 3 is a perspective view of fan baffle 104. As described above with respect to FIGS. 2a and 2b, fan baffle 104 includes outer ring 106, inner ring 108, and fan blades 110. Fan blades 110 are oriented at fan angle ω along inner ring 108, with respect to funnel axis $A_F$. Fan angle ω can, for example, be greater than XX and less than YY. Fan blades 110 are oriented to be substantially tangent to, and thereby oppose, the path of stray adhesive pellets from inlet 18. In this way, fan blades 110 prevent adhesive from travelling upwards into sensor housing 112 and filter 122, without impeding exit airflow $F_E$. Some adhesive pellets may nevertheless ricochet upwards through fan baffle 104, but are likely to be stopped by ribs 120 of sensor housing 112, and fall back through fan baffle 104 into funnel 100.

Feed assembly 14 distributes adhesive pellets in a narrow pressurized flow from inlet 18 substantially uniformly across feed outlet 20, a wide planar aperture substantially normal to funnel axis $A_F$. This arrangement ensures that adhesive will be substantially uniformly distributed across the top of melter 16. Feed assembly 14 also positions sensor 128 with an unobstructed FoV to melter 16. Because funnel surface 102 distributes adhesive substantially evenly across melter 16, measurements by sensor 128 are able to accurately reflect the level of adhesive within melter 16.

Discussion of Possible Embodiments

The following are non-exclusive descriptions of possible embodiments of the present invention.

A feed assembly for a melter, the feed assembly comprising: a funnel oriented along a vertical funnel axis, and having a funnel surface that narrows towards an outlet into the melter; an inlet into the funnel, angled tangent to and downward towards the funnel surface to inject meltable pellets onto the funnel surface in a vortex pattern; a fan baffle situated atop the funnel, the fan baffle having a plurality of blades angled to oppose the vortex pattern, so as to permit airflow through the fan baffle but redirect the meltable pellets from the inlet away from the fan baffle, towards the funnel surface.

The feed assembly of the preceding paragraph can optionally include, additionally and/or alternatively, any one or more of the following features, configurations and/or additional components:

A further embodiment of the feed assembly, wherein the inlet is angled between 65° and 75° off of the vertical funnel axis.

A further embodiment of the feed assembly, wherein the blades of the fan baffle are angled between 0° and 90° relative to the vertical funnel axis.

A further embodiment of the feed assembly, further comprising: a level sensor retained in a sensor tower situated coaxially with the funnel.

A further embodiment of the feed assembly, wherein the level sensor is a downward-facing ultrasonic sensor.

A further embodiment of the feed assembly, wherein the sensor tower is vertically aligned with the vertical funnel axis.

A further embodiment of the feed assembly, further comprising: a sensor housing disposed between the fan baffle and the sensor tower, the sensor housing having an outer ring, an inner ring disposed to receive and support the sensor tower, and an annular air passage disposed between the inner ring and the outer ring to permit exit airflow from the funnel.

A further embodiment of the feed assembly, further comprising: a filter disposed on the sensor housing to catch particulates in the exit airflow.

A hot melt adhesive system comprises: a solid adhesive source; a melter; a funnel disposed along a vertical funnel axis on the melter, and having a funnel surface that narrows towards a planar outlet into the melter, wherein the planar outlet is oriented normal to the funnel axis; an inlet from the solid adhesive source into the funnel, the inlet angled tangent to the funnel surface and towards the melter to inject meltable pellets onto the funnel surface in a vortex pattern.

The hot melt adhesive system of the preceding paragraph can optionally include, additionally and/or alternatively, any one or more of the following features, configurations and/or additional components:

A further embodiment of the hot melt adhesive system, wherein the planar outlet has a cross-sectional area at least half of a cross-sectional area of the melter.

A further embodiment of the hot melt adhesive system, further comprising: a fan baffle situated atop the funnel, the fan baffle having a plurality of blades that permit airflow but redirect the solid adhesive pellets from the inlet towards the funnel.

A further embodiment of the hot melt adhesive system, wherein the plurality of blades are angled to oppose the vortex pattern.

A further embodiment of the hot melt adhesive system, further comprising: an adhesive level sensor retained in a sensor tower situated coaxially with the funnel.

A further embodiment of the hot melt adhesive system, wherein the adhesive level sensor is a downward-facing ultrasonic sensor.

A further embodiment of the hot melt adhesive system, wherein the sensor tower is vertically aligned with an eye of the vortex pattern.

Although the present invention has been described with reference to preferred embodiments, workers skilled in the art will recognize that changes may be made in form and detail without departing from the spirit and scope of the invention.

The invention claimed is:

1. A feed assembly for a melter, the feed assembly comprising:
  a funnel oriented along a vertical funnel axis, and having a funnel surface that narrows towards an outlet into the melter;
  an inlet into the funnel, angled tangent to and downward towards the funnel surface to inject meltable pellets onto the funnel surface in a vortex pattern;
  a fan baffle situated atop the funnel, the fan baffle having a plurality of blades angled to oppose the vortex pattern, so as to permit airflow through the fan baffle but redirect the meltable pellets from the inlet away from the fan baffle, towards the funnel surface.

2. The feed assembly of claim 1, wherein the inlet is angled between 65° and 75° off of the vertical funnel axis.

3. The feed assembly of claim 1, wherein the blades of the fan baffle are angled between 0° and 90° relative to the vertical funnel axis.

4. The feed assembly of claim 1, further comprising:
  a level sensor retained in a sensor tower situated coaxially with the funnel.

5. The feed assembly of claim 4, wherein the level sensor is a downward-facing ultrasonic sensor.

6. The feed assembly of claim 4, wherein the sensor tower is vertically aligned with the vertical funnel axis.

7. The feed assembly of claim 4, further comprising:
  a sensor housing disposed between the fan baffle and the sensor tower, the sensor housing having an outer ring, an inner ring disposed to receive and support the sensor tower, and an annular air passage disposed between the inner ring and the outer ring to permit exit airflow from the funnel.

8. The feed assembly of claim 7, further comprising:
  a filter disposed on the sensor housing to catch particulates in the exit airflow.

9. A hot melt adhesive system comprising:
  a solid adhesive source;
  a melter;
  a funnel disposed along a vertical funnel axis on the melter, and having a funnel surface that narrows towards a planar outlet into the melter, wherein the planar outlet is oriented normal to the funnel axis;
  an inlet from the solid adhesive source into the funnel, the inlet angled tangent to the funnel surface and towards the melter to inject meltable pellets onto the funnel surface in a vortex pattern; and
  a fan baffle situated atop the funnel, the fan baffle having a plurality of blades that permit airflow but redirect the solid adhesive pellets from the inlet towards the funnel, wherein the plurality of blades are angled to oppose the vortex pattern.

10. The hot melt adhesive system of claim 9, wherein the planar outlet has a cross-sectional area at least half of a cross-sectional area of the melter.

11. The hot melt adhesive system of claim 9, further comprising:
  an adhesive level sensor retained in a sensor tower situated coaxially with the funnel.

12. The hot melt adhesive system of claim 11, wherein the adhesive level sensor is a downward-facing ultrasonic sensor.

13. The hot melt adhesive system of claim 11, wherein the sensor tower is vertically aligned with an eye of the vortex pattern.

* * * * *